No. 805,824. PATENTED NOV. 28, 1905.
S. S. STITT.
APPARATUS FOR SETTLING DUST RAISED BY MOTOR VEHICLES.
APPLICATION FILED SEPT. 28, 1905.
2 SHEETS—SHEET 1.
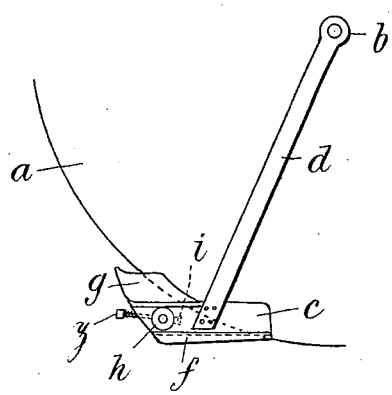
Fig:1.
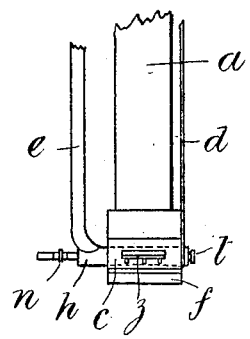
Fig:2.
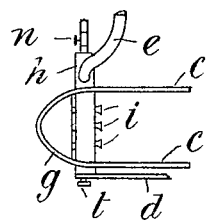
Fig:3.
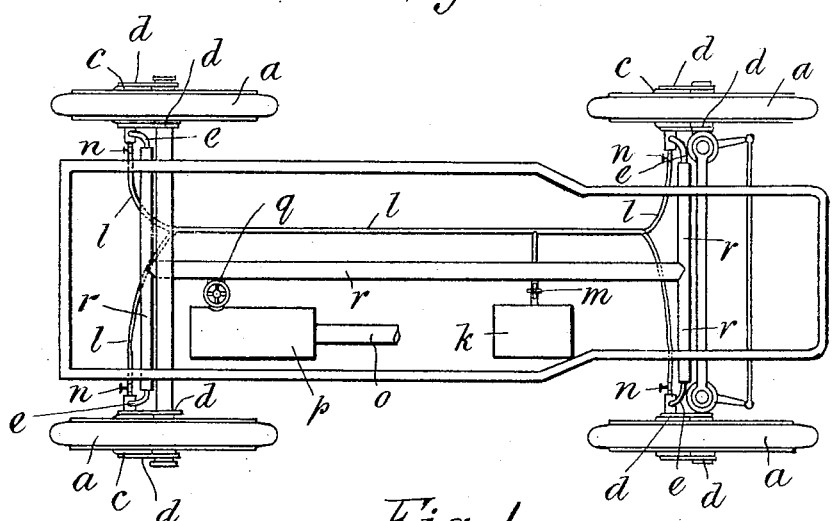
Fig:4.
Witnesses
Edwin D. Bartlett
Albert O. Jenck
Inventor
Samuel Stewart Stitt
per Herbert Sefton Jones
Attorney.

No. 805,824. PATENTED NOV. 28, 1905.
S. S. STITT.
APPARATUS FOR SETTLING DUST RAISED BY MOTOR VEHICLES.
APPLICATION FILED SEPT. 28, 1905.

2 SHEETS—SHEET 2.

Witnesses
Edwin D. Bartlett
Albert W. Neale

Inventor
Samuel Stewart Stitt
per Herbert Sefton Jones
Attorney.

UNITED STATES PATENT OFFICE.

SAMUEL STEWART STITT, OF CAMBRIDGE, ENGLAND.

APPARATUS FOR SETTLING DUST RAISED BY MOTOR-VEHICLES.

No. 805,824. Specification of Letters Patent. Patented Nov. 28, 1905.

Application filed September 28, 1905. Serial No. 280,511.

*To all whom it may concern:*

Be it known that I, SAMUEL STEWART STITT, master of arts, Clerk in Holy Orders, a subject of the King of Great Britain, residing at Gonville and Caius College, Cambridge, in the county of Cambridge, England, have invented new and useful Improvements in Apparatus for Settling Dust Raised by Motor Road-Vehicles, of which the following is a specification.

This invention has for its object an apparatus applicable to motor road-vehicles and designed to settle the dust raised by the wheels of such vehicles. The principal part of the dust raised by motor-vehicles comes from the wheels and is due to the action of the wheel-tires upon the road-surface. The device I have invented is designed to deal with this dust immediately it is raised and to prevent said dust from being distributed in a cloud behind the car.

The invention is illustrated in the accompanying drawings, in which—

Figure 5:
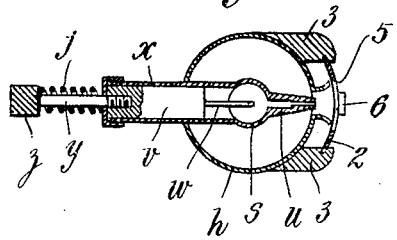
Figure 6:
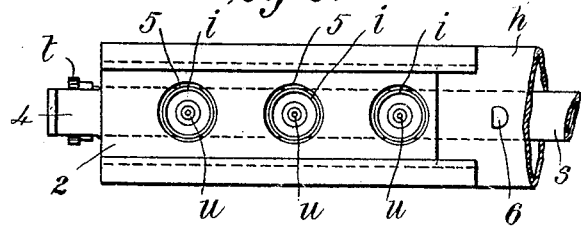
Figure 8:
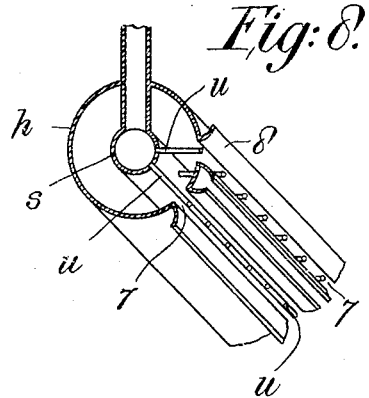
Figure 7:
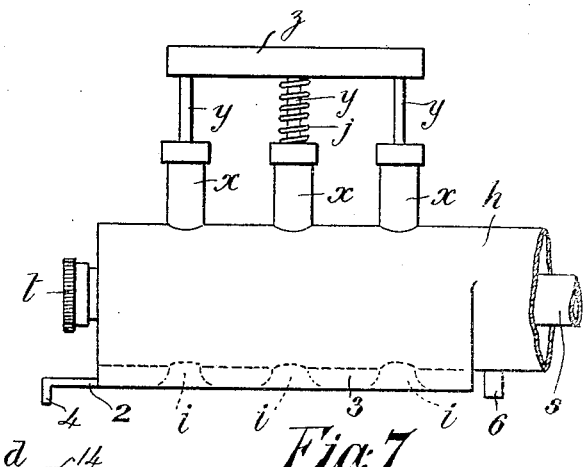
Figure 9:
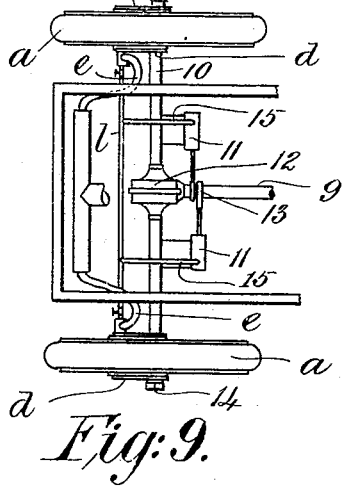

Figure 1 shows a side view of the dust-settling device applied to one wheel of a motor-car. Fig. 2 shows a rear view of the device. Fig. 3 shows a plan view of the dust-collecting shoe seen in Figs. 1 and 2. Fig. 4 is a diagrammatic plan view of a car, showing one method of connecting up the dust-settling apparatus thereon. Fig. 5 shows a section through a spraying-nozzle used in the device. Figs. 6 and 7 are front and plan views, respectively, showing the spraying apparatus used in the device of Figs. 1 and 2, but drawn on an enlarged scale. Fig. 8 is a detail view illustrating a modified form of spraying apparatus. Fig. 9 is a diagrammatic plan view showing a modified apparatus for supplying the gas or air under pressure for spraying.

Referring first to Figs. 1 and 2, $a$ represents the tire of a motor-car wheel (a rear wheel in this case;) $b$, the end of the wheel-axle. $c$ is a shoe, preferably of metal, supported on the one side by a rod $d$, fixed to the end of the axle $b$ and on the other side by a pipe $e$, referred to below. The shoe $c$ may be simply a metal plate bent to U shape. The shoe is supported at a little distance above the road-surface and carries a fringe $f$ of leather or the like around its lower edge. It preferably also carries a flap $g$ of leather or the like at its upper edge at the back thereof. Across the shoe at a little distance from the surface of the tire $a$ extends a pipe $h$, provided with spraying-nozzles $i$. These nozzles may be made in various ways, as hereinafter referred to. They are shown in Figs. 1 and 2 as being directed slightly downward and toward the surface of the tire $a$, which is rising from the road-surface. Each wheel has a shoe $c$ applied thereto in suitable manner, each shoe having a spraying apparatus therein. The shoes for the back wheels are supported by rods $d$ and fixed pipes $e$, as already explained. The shoes for the front wheels are preferably mounted by rods $d$ at each side thereof, Fig. 4, said rods being fixed to the ends of the wheel-axles 16 on the outside and to the pivoting wheel-supports 17 on the inside, so that the shoes will always move with the wheels. $k$, Fig. 4, is a tank for containing the spraying liquid, usually water, this tank being arranged in any convenient position on the car—as, for instance, under the driver's seat. Pipes $l$ extend from the tank to each spraying apparatus, the flow of water from the tank $k$ into these pipes being controlled by a cock $m$, while separate taps $n$ may be provided adjacent to each spraying apparatus for regulating the feed of water thereto. The parts of the piping $l$ leading to the spraying apparatus on the front wheels must be flexible in order to leave said wheels free for steering. $o$ is the exhaust-pipe leading from the engine, (not shown,) which is here assumed to be an internal-combustion engine, and $p$ is the exhaust-silencer of any type. A by-pass valve $q$ from the silencer allows any desired proportion of the exhaust-gases to pass into a set of pipes $r$, adapted to convey the gases to the pipes $e$, connected with the spraying apparatus in each shoe $c$. The pipes $e$, leading to the front-wheel spraying-shoes, must be flexible, as illustrated, in order to allow said shoes to move freely with the wheels.

One suitable form of spraying apparatus is illustrated in Figs. 5, 6, and 7. The pipe $h$ here carries three nozzles $i$, which are bell shape, as shown. Inside the pipe $h$ extends a smaller pipe $s$, connected at one end with the water-pipes $l$ and provided at the other end with a screwed cap $t$ to give access thereto. A small tube $u$ extends from the pipe $s$ to the center of each spraying-nozzle $i$. The exhaust-gases reach the pipe $h$ through the pipe $e$, as before explained, and they escape through the spraying-nozzles $i$, drawing out from the tubes $u$, and distributing through said nozzles water from the internal pipe $s$. By this means a finely-divided spray is produced in each shoe c, and the dust particles coming into this spray are wetted and settled either directly upon the road or around the sides of the shoe, from which they ultimately drop upon the road in the form of clots of mud.

It is desirable to have a device for clearing the spraying-nozzles should they become choked with mud or the like, and it is also desirable to provide means for protecting these nozzles in wet weather when they are not in use. For clearing the nozzles sets of plungers $v$ are shown working in guide-tubes $x$ and having pins $w$ adapted to pass into the nozzle-tubes $u$. The plungers $v$ have rods $y$, connected together by a yoke-piece $z$ and preferably drawn backward by a spring $j$. To clear the nozzles in case they are stopped, it is only necessary to press inward the yoke-piece $z$, whereby all the pins $w$ will be simultaneously forced through the nozzle-tubes $u$. If this action fails to clear the nozzle-holes for any reason, access can be obtained to the interior of the water-pipe $s$ by removing the cap $t$.

For protecting the nozzles when not in use a plate 2 is provided, sliding in guides 3 and adapted to be moved by a finger-piece 4. Said plate has holes 5 therein adapted to register with the mouths of the nozzles $i$ when in the position seen in Fig. 6. If, however, the finger-piece 4 is pressed inward, the end of the plate is moved up to a stop 6, and the holes 5 are then out of register with the nozzles $i$, so that these latter are shielded.

It is to be understood that the invention is not limited to the use of any particular number of nozzles $i$ in each shoe or any particular construction of these nozzles, so long as they are efficient spraying-nozzles from which liquid can be sprayed by the action of the compressed gas or air. Fig. 8, for instance, shows a different form of nozzle, formed in this case by a long slit 7, into which the tubes from the water-pipe $s$ project. Two such slits 7 are shown in this case with a number of tubes $u$ directed into the same and with spreading-plates 8 at each side thereof. The spraying is effected in this case in exactly the same manner as above explained by the gas in the pipe $h$ escaping around the ends of the tubes $u$.

It is to be understood also that any convenient gas or vaper under pressure may be used for effecting the spraying. For instance, if the motor-car has a steam-motor the waste steam may be carried through the piping $r$ and $e$ to the spraying apparatus, or gas from a suitable storage-chamber might be conveyed to said piping. Generally, however, the waste gases of the engine will be used.

Fig. 9 shows how air compressed by suitable pumps might be utilized to effect the spraying. $a\ a$, as before, represent the motor-tires, and 9 is the power-shaft driving the rear axle through the usual differential gearing 12. 11 11 are force-pumps actuated by eccentrics 13 on the shaft 9 and acting to compress air into the piping 15, which leads to the spraying apparatus $h$. In this case, as live axles are used, the rods $d$ for the back wheels must be mounted outside said wheels on bearings 14, within which the wheel-hub can freely rotate. In order to further strengthen the mounting of the shoe, an additional supporting-rod $d$ may be arranged at the inner side of the wheel, fixed at its end on the casing 10 of the live axle, as shown.

Finally, it is to be understood that the invention is not limited to the exact shape of the shoe shown. It is only necessary that this shoe should lie in proximity to the wheel close behind the point where said wheel rolls upon the road-surface and that the shoe should to some extent embrace the wheel in order to form a casing or scoop wherein the dust-settling operation may be accomplished. It has been found experimentally that the best results are obtained if there is sufficient spray to moisten the surface of the wheel-tires to a certain extent; but that is not essential. The whole interior of the shoe will of course become moist during working, and the dust thrown against the walls of the shoe will be saturated in the water and gradually washed down until it drops upon the road.

What I claim is—

1. An apparatus for settling dust raised by the wheels of motor road-vehicles, said apparatus comprising means for producing a spray of finely-divided liquid behind the wheels of the vehicle, and means for supplying liquid and gas under pressure to the spraying apparatus.

2. An apparatus for settling dust raised by the wheels of motor road-vehicles, said apparatus comprising spraying-nozzles and means for supporting the same behind the vehicle-wheels, a tank for liquid and pipes for conveying the liquid to the nozzles, a source of gas under pressure and means for supplying said gas to the spraying-nozzles.

3. An apparatus for settling dust raised by the wheels of motor road-vehicles, said apparatus comprising a shoe behind each wheel and in proximity to the point of contact of the wheel-tire with the road, means for supporting each shoe, spraying apparatus inside each shoe, means for supplying liquid to said spraying apparatus, and means for supplying gas under pressure to the spraying apparatus.

4. In an apparatus for settling dust applicable to motor road-vehicles, the combination with the motor-car and engine thereof, of a shoe behind each wheel and in proximity to the point of contact of the wheel-tire with the road, means for supporting each shoe, spraying apparatus inside each shoe, means for supplying liquid to said spraying apparatus, and means for conveying the exhaust-gases of the engine to the spraying apparatus whereby said gases are utilized for making the liquid spray.

5. An apparatus for settling the dust raised by the wheels of motor road-vehicles, said apparatus comprising means for confining the dust to a certain space, and means for producing a spray of finely-divided liquid within the space.

6. An apparatus for settling the dust raised by the wheels of motor road-vehicles, said apparatus comprising a shoe adapted to confine the dust within a certain space, a pipe mounted in said shoe, spraying-nozzles mounted on said pipe, means for conveying gas under pressure to said nozzles, means for supplying water to said nozzles, and means for clearing the nozzles from obstruction.

In testimony whereof I have signed my name to this specification in the presence of two subscribing witnesses.

SAMUEL STEWART STITT.

Witnesses:
   HUBERT A. GILL,
   FREDK. L. RAND.